May 13, 1930.  J. F. GAYLORD  1,758,106
TRANSMISSION DECLUTCHING MECHANISM
Filed March 19, 1928   2 Sheets-Sheet 1
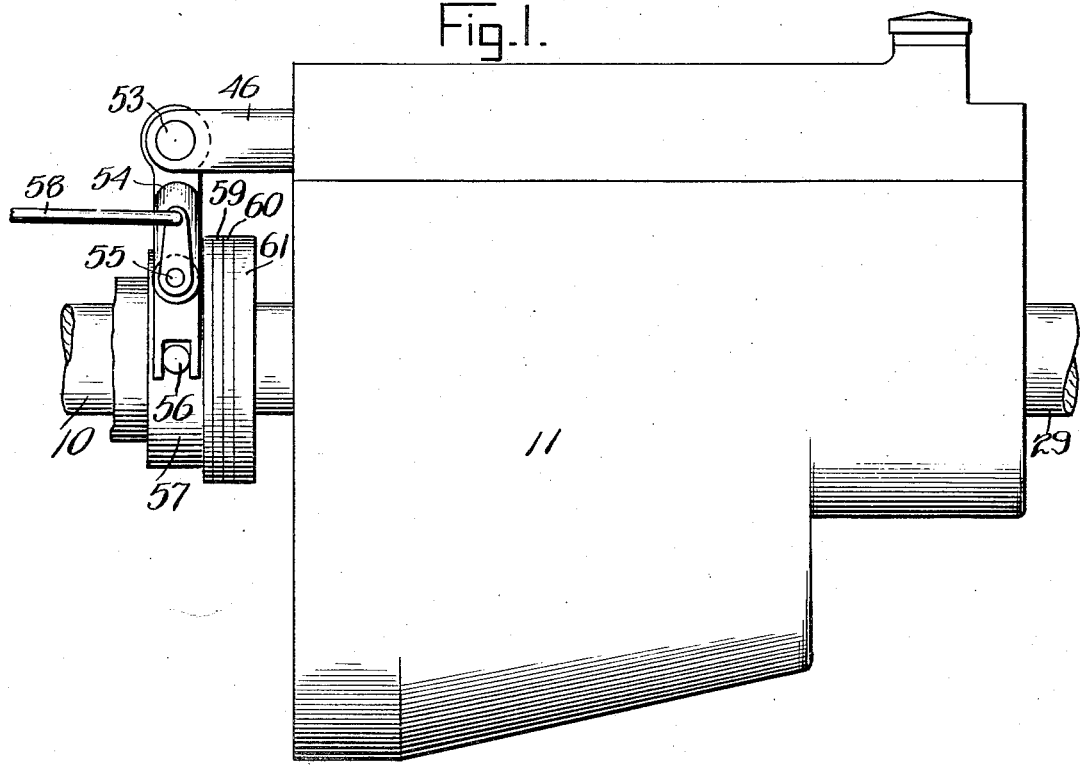
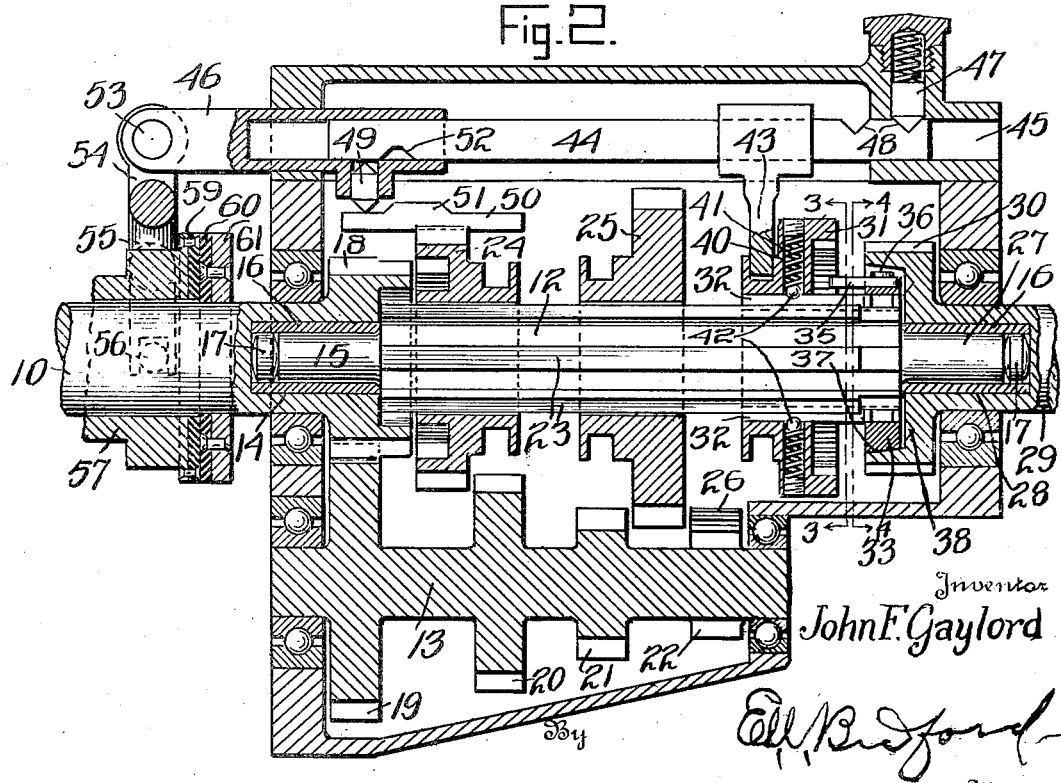
Inventor
John F. Gaylord
By
E. W. Bradford
Attorney May 13, 1930.　　　　　　J. F. GAYLORD　　　　　　1,758,106
TRANSMISSION DECLUTCHING MECHANISM
Filed March 19, 1928　　2 Sheets-Sheet 2
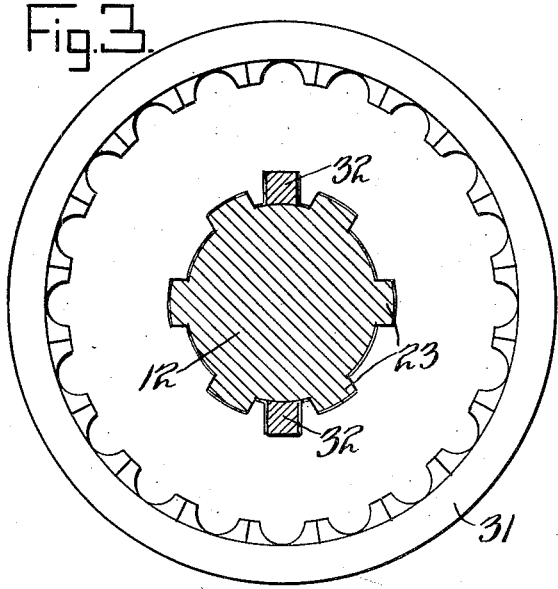
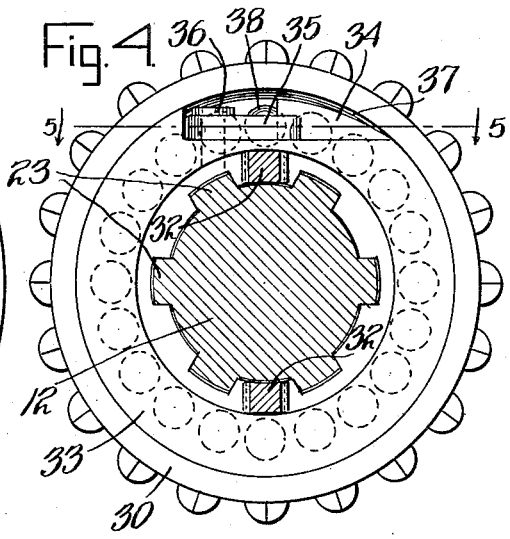
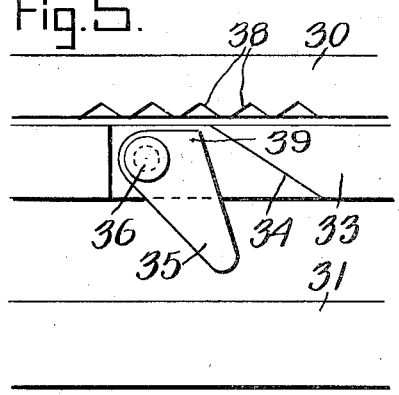
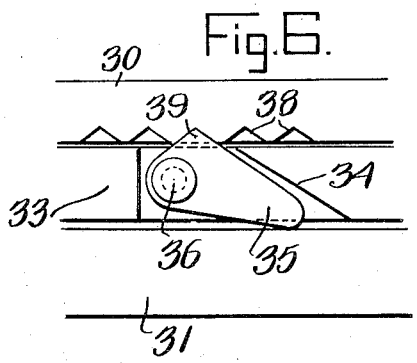
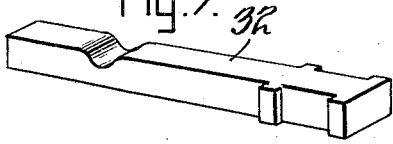
Inventor
John F. Gaylord
By
Attorney Patented May 13, 1930

1,758,106

UNITED STATES PATENT OFFICE

JOHN FLETCHER GAYLORD, OF FLINT, MICHIGAN

TRANSMISSION-DECLUTCHING MECHANISM

Application filed March 19, 1928. Serial No. 262,838.

My invention relates to transmission declutching mechanism designed for disconnecting the transmission of an automobile from the associated driving and driven shafts in order to permit a quiet and easy changing of the gears, and more particularly to a clutch for connecting the driving and driven shafts. It is an object of the invention to provide a device of this character which is simple in construction and by means of which the clutching operations may be positively performed simultaneously with the operation of the main clutch upon the depression of the clutch pedal so that any desired shift of gears can be easily and noiselessly accomplished no matter at what speed the vehicle is travelling, all as will be hereinafter more particularly described and claimed.

Referring to the accompanying drawings which are made a part hereof and on which similar reference characters indicate similar parts, Figure 1 is a side elevation illustrating the application of my invention, Figure 2, a longitudinal vertical section, Figure 3, a side elevation of one of the clutch members taken on the line 3—3 of Fig. 2, Figure 4, a side elevation of a cooperating clutch member viewed on the line 4—4 of Fig. 2, Figures 5 and 6, sections on the line 5—5 of Fig. 4 with the parts in different positions, and Figure 7, a perspective of one of the splines.

In the drawings reference character 10 indicates a drive shaft which has its rear end projecting into a transmission case 11 and which houses a main transmission shaft 12 and a stub or auxiliary transmission shaft 13, the main shaft being supported in axial alinement with the drive shaft 10. A driven shaft 29 is supported in axial alinement with the main shaft 12 at the rear end of the same and said driven shaft extends to the differential gearing. The drive shaft 10 is provided with a socket or recess 14 in its rear end into which the reduced end 15 of the main transmission shaft extends. A bearing sleeve 16 is preferably mounted in the recess about the reduced end of the main shaft 12 and a thrust bearing 17 is preferably provided between the reduced end of the shaft 12 and the inner end of the recess for accommodating the end thrusts of the respective shafts.

The extremity of the drive shaft 10 is provided with an external gear 18 either formed integrally with the shaft or in any manner to insure positive rotation therewith. The stub shaft 13 has fixed thereon gears 19, 20, 21, and 22 of decreasing size, the largest gear 19 being constantly in direct engagement with the gear 18 for positively driving the stub shaft when the shaft 10 is driven. The shaft 12 is provided with longitudinal ribs or splines 23 by means of which a pair of gears 24 and 25 are slidable but non-rotatable thereon. The gear 24 is also a clutch member and is movable into direct engagement with the gear 18 on the end of the drive shaft for effecting a direct drive between the shafts 10 and 12, or the gear 24 may be moved into engagement with the gear 20 on the stub shaft for effecting an indirect drive or intermediate gear. Likewise, the gear 25 may be moved into engagement with the gear 21 for effecting a lower or first gear or may be moved in the opposite direction into engagement with an intermediate gear 26 which meshes with the gear 22 for obtaining reverse gear. The gears 24 and 25 are moved by the conventional gear shift lever (not shown).

In shifting gears of ordinary transmissions, on account of the different rotative speeds, much difficulty is experienced. This is especially true when the shifting is from a higher to a lower gear and in order to easily and quietly accomplish the desired shift, I provide means for disengaging or releasing the transmission at both ends or from the driving and the driven shafts.

The main shaft 12 is provided with a rear reduced end 27 which fits into a bearing sleeve 16 in a socket or recess 28 and against a thrust bearing 17 in said socket, the recess being located in the front end of the driven shaft 29 which extends to the differential (not shown). A clutch member 30 is formed integrally with or is otherwise fixedly mounted within the casing 11 on the shaft 29 and is adapted to be engaged by a clutch member 31 held by splines 23 on the shaft 12, means being provided for causing the shafts 12 and 29 to rotate in synchronism prior to the engagement of the clutch member 30 with the clutch member 31. Said means comprises a cone clutch member 33 having one sector cut away at 34 to accommodate a latch 35 pivoted on a pin 36. The cone clutch member 33 is provided with spaced axial slots in which are received longitudinally slidable keys or pins 32 located between the splines 23 on the shaft 12, said keys having longitudinally spaced lateral projections which prevent the cone member from moving longitudinally of the keys. The peripheral surface of the cone clutch member 33 is adapted to engage the inner cone face 37 of the clutch member 30 for causing the shafts 12 and 29 to operate synchronously. In order however to cause the teeth of the members 30 and 31 to be disposed in alignment immediately prior to their direct engagement the side face of the clutch member 30 beneath the cone face 37 is provided with a plurality of recesses 38 in one of which the heel 39 of the latch 35 is adapted to enter to positively bring the external teeth on the member 30 and the internal teeth on the member 31 into registry.

In order to cause the clutch member 31 to snap into engagement with the clutch member 30, said clutch member is provided with a plurality of radial recesses 40 in which are disposed coiled springs 41 which bear against balls 42 which normally seat in recesses in the keys 32. The clutch gear 31 is moved along the shaft 12 by means of a fork 43 carried by a shifter rod 44. The shifter rod 44 has its rear end journalled in a receiving opening 45 in the rear of the transmission casing 11 and has its front end extending into the end of a tubular shifting member 46 extending through the forward end of the casing. A spring pressed detent 47 engages notches 48 in the rear portion of the rod and another detent 49 is carried by the tubular shifting member 46 adjacent the front end of the rod and which rides upon a track or fixed member 50 carried by the casing. The track or fixed member 50 is provided with an elevation 51 upon which the detent 49 is adapted to ride subsequent to its entering a recess 52 in the shifter rod 44. The front end of the tubular shifting member 46 is connected by means of a hinge pin 53 with a yoke 54 having pins 55 journalled in fixed bearings (not shown). The lower extremities of the yoke are bifurcated and engage studs 56 upon a clutch throw-out collar 57. The yoke 54 is provided with a connection 58 which extends to the clutch pedal of the automobile by means of which it is operated. The clutch throw-out collar 57 has a friction member 59 of leather or the like riveted to its rear face which is adapted to engage a similar friction member 60 riveted to a collar 61 fixed to the shaft 10.

In Figs. 1 and 2 the parts are in the position that they will assume when the clutch pedal of the car is depressed and the transmission is declutched or disengaged from driving engagement with the drive shaft of the engine and the shaft which drives the differential. Also the cooperating friction collars 59 and 60 are shown engaged in the manner in which they function as a brake for the drive shaft 10. When the parts are in the position just described, the gear changing operations may be easily and quietly performed. Upon release of the clutch pedal the friction members 59 and 60 will be separated by the rocking action of the yoke 54 and the member 46 will be moved rearwardly into the transmission casing so that the detent 49 will ride along the track 50 up the inclined end of the track 51 and into the notch 52. The rod 44 will then move rearwardly while the detent is carried along over the elevation 51 and the clutch gear 31 and keys 32, carrying the cone clutch member 33, will be moved by the yoke 43 until the cone clutch member engages the inner face 37 of the member 30 and synchronizes the movements of the shafts 12 and 29. The synchronizing action is brought about by pressure on clutch or locking member 31 pressing it to the rear. Springs 41 hold pressure on balls 42 in keys 32 in the slots crosswise the keys. When the cone clutch member 33 is pressed rearwardly toward locking position the springs and balls 41 and 42 will cause the keys 32 to move longitudinally of the shaft. The clutch member 33 mounted upon the keys 32 presents its shoulder to the inner surface of the clutch member 30, the friction between the two members will cause them to rotate synchronously, and a continued rearward pressure will cause the balls to snap out of the depressions in the keys 32 and the edge of member 31 will press against latch 35 causing it to move bringing the heel 39 against the cone face 37 and into one of the recesses 38, thereby bringing the external teeth of member 30 into positive line with the internal teeth of member 31. The latch is positioned in member 33 directly in line with the teeth of member 31 and the recesses 38 are in direct line radially with the teeth of member 30 therefore when the heel 39 of latch 35 engages notch 38 of gear 30 the teeth of gear 30 must necessarily be in axial alinement with the teeth of member 31 and positive connection is obtained.

It will be obvious to those skilled in the art that various changes may be made in my device without departing from the spirit of the invention and I, therefore, do not limit myself to what is shown in the drawings and described in the specification, but only as set forth in the appended claims.

Having thus fully described my said invention, what I claim as new and desire to secure by Letters Patent, is:

1. The combination of a pair of aligned shafts, a fixed clutch member on one of said shafts, a movable clutch member on the other shaft, an intermediate clutch member shiftable with the movable clutch member and adapted to engage the fixed clutch member for causing the shafts to rotate in synchronism prior to the connection between the fixed and movable clutch members, said intermediate clutch member having a beveled face adapted to engage the fixed clutch member, and a latch to guide the aligned shafts into definite relative rotary positions, substantially as set forth.

2. A device of the class described comprising aligned shafts, a clutch member fixed on one of said shafts, a second clutch member longitudinally movable on the other shaft, an intermediate clutch member associated with one of the clutch members and adapted to engage the other clutch member for causing the shafts to rotate in synchronism prior to the connection between the fixed and movable clutch members, said fixed clutch member having a plurality of recesses therein, a latch mounted in said intermediate clutch member, said latch having a heel adapted to enter any one of said recesses for guiding the clutch members into definite relative rotary positions to permit free engagement of the same, substantially as set forth.

In witness whereof, I have hereunto set my hand at Flint, Michigan this 29th day of February, A. D. nineteen hundred and twenty eight.

JOHN FLETCHER GAYLORD.